(12) United States Patent
Song et al.

(10) Patent No.: US 11,658,702 B2
(45) Date of Patent: May 23, 2023

(54) ELECTRIC APPLIANCE IDENTIFICATION METHOD AND APPARATUS

(71) Applicant: HUAWEI TECHNOLOGIES CO., LTD., Guangdong (CN)

(72) Inventors: Biwei Song, Dongguan (CN); Hao Zhang, Shenzhen (CN); Yuming Xie, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/547,037

(22) Filed: Dec. 9, 2021

(65) Prior Publication Data

US 2022/0103203 A1 Mar. 31, 2022

Related U.S. Application Data

(63) Continuation of application No. PCT/CN2020/094991, filed on Jun. 8, 2020.

(30) Foreign Application Priority Data

Jun. 11, 2019 (CN) .......................... 201910502300.2

(51) Int. Cl.
*H04B 3/54* (2006.01)
*H04B 3/46* (2015.01)
(52) U.S. Cl.
CPC ............... *H04B 3/542* (2013.01); *H04B 3/46* (2013.01)
(58) Field of Classification Search
CPC . H04B 3/542; H04B 3/46; H04B 3/54; H04B 17/00
See application file for complete search history.

(56) References Cited

U.S. PATENT DOCUMENTS

| 6,329,905 | B1 | 12/2001 | Cunningham |
|---|---|---|---|
| 9,106,318 | B1 | 8/2015 | Seol et al. |
| 10,270,249 | B2 | 4/2019 | Covic et al. |

(Continued)

FOREIGN PATENT DOCUMENTS

| CN | 101368985 A | 2/2009 |
|---|---|---|
| CN | 101510425 A | 8/2009 |

(Continued)

OTHER PUBLICATIONS

Extended European Search Report issued in European Application No. 20821932.9 dated Jun. 15, 2022, 8 pages.

(Continued)

*Primary Examiner* — Khanh C Tran
(74) *Attorney, Agent, or Firm* — Fish & Richardson P.C.

(57) ABSTRACT

Example electric appliance identification methods and apparatuses are provided. One example method includes obtaining, by a power line communication (PLC) device, a first noise signal in a circuit. The PLC device can then obtain first data based on the first noise signal, where the first data is used to describe a time-frequency feature of the first noise signal. The PLC device can then obtain, based on an electric appliance identification model and the first data, an electric appliance identification result corresponding to the first noise signal, where the electric appliance identification model is obtained based on a signal including a second noise signal of at least one known electric appliance.

18 Claims, 7 Drawing Sheets

(56) References Cited

U.S. PATENT DOCUMENTS

| | | | |
|---|---|---|---|
| 11,119,141 B2* | 9/2021 | Patel | G01R 29/26 |
| 2005/0017846 A1 | 1/2005 | Butler et al. | |
| 2009/0072985 A1* | 3/2009 | Patel | G06F 17/00 |
| | | | 340/657 |
| 2010/0280978 A1 | 11/2010 | Shimada et al. | |
| 2011/0196634 A1 | 8/2011 | Kemp et al. | |
| 2012/0093240 A1* | 4/2012 | McFarland | H04B 3/54 |
| | | | 375/257 |
| 2012/0134395 A1* | 5/2012 | Varadarajan | H04B 3/542 |
| | | | 375/220 |
| 2013/0200689 A1 | 8/2013 | Park et al. | |
| 2013/0289788 A1 | 10/2013 | Gupta et al. | |
| 2014/0143578 A1 | 5/2014 | Cenizal et al. | |
| 2014/0269860 A1 | 9/2014 | Brown et al. | |
| 2016/0309352 A1 | 10/2016 | Yuan et al. | |
| 2019/0013470 A1 | 1/2019 | Bogdanovich | |

FOREIGN PATENT DOCUMENTS

| | | |
|---|---|---|
| CN | 101772901 A | 7/2010 |
| CN | 102193041 A | 9/2011 |
| CN | 102347811 A | 2/2012 |
| CN | 102388572 A | 3/2012 |
| CN | 102414956 A | 4/2012 |
| CN | 103544953 A | 1/2014 |
| CN | 104270206 A | 1/2015 |
| CN | 105098806 A | 11/2015 |
| CN | 105874405 A | 8/2016 |
| CN | 106054636 A | 10/2016 |
| CN | 106409289 A | 2/2017 |
| CN | 106940806 A | 7/2017 |
| CN | 107102196 A | 8/2017 |
| CN | 107368805 A | 11/2017 |
| CN | 108073856 A | 5/2018 |
| CN | 108880622 A | 11/2018 |
| CN | 109565627 A | 4/2019 |
| EP | 2784944 A1 | 10/2014 |
| JP | S5812437 A | 1/1983 |

OTHER PUBLICATIONS

Office Action issued in Chinese Application No. 201910502300.2 dated Mar. 3, 2022, 8 pages.

Office Action issued in Chinese Application No. 201910502300.2 dated Apr. 8, 2021, 14 pages (with English translation).

Office Action issued in Chinese Application No. 201910502300.2 dated Oct. 28, 2021, 11 pages (with English translation).

PCT International Search Report and Written Opinion issued in International Application No. PCT/CN2020/094991 dated Aug. 31, 2020, 18 pages (with English translation).

Semwal et al., "Identifying Appliances using NIALM with Minimum Features," International Journal of Electrical and Computer Engineering (IJECE) ,vol. 4, No. 6, Dec. 2014, 14 pages.

* cited by examiner

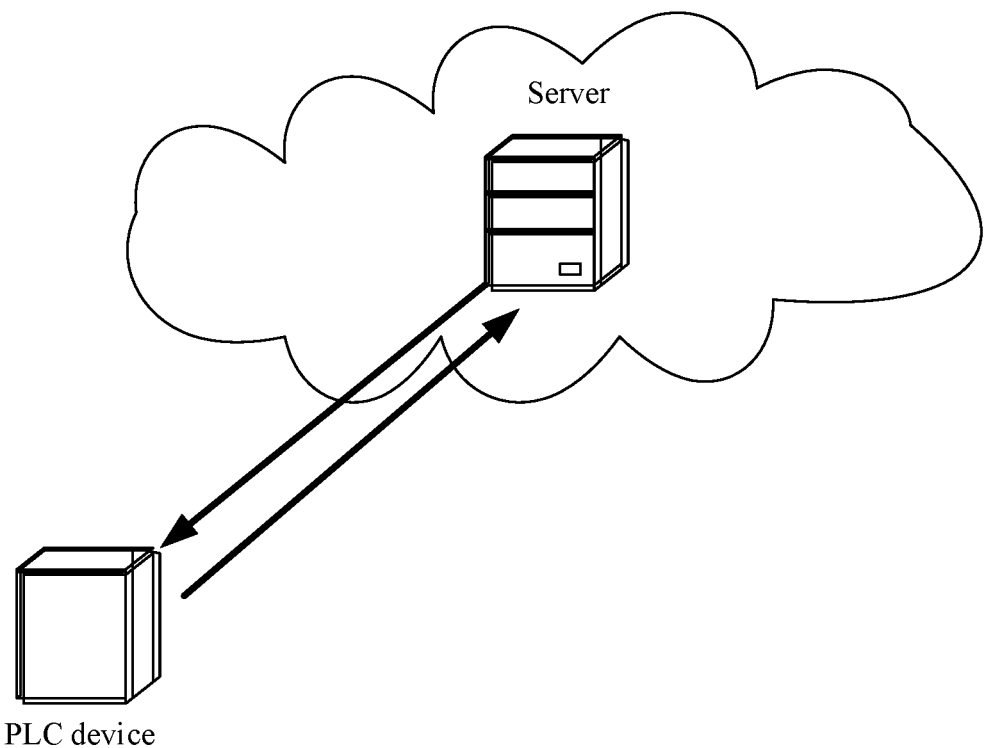

FIG. 2

Step 300: A PLC device obtains a noise signal in a circuit

Step 310: The PLC device obtains first data of the noise signal based on the noise signal Step 320: The PLC device obtains, based on an electric appliance identification model and the first data, an electric appliance identification result corresponding to the noise signal, where the electric appliance identification model is obtained based on a signal including a noise signal of at least one known electric appliance

FIG. 3

ELECTRIC APPLIANCE IDENTIFICATION METHOD AND APPARATUS

CROSS-REFERENCE TO RELATED APPLICATIONS

This application is a continuation of International Application No. PCT/CN2020/094991, filed on Jun. 8, 2020, which claims priority to Chinese Patent Application No. 201910502300.2, filed on Jun. 11, 2019. The disclosures of the aforementioned applications are hereby incorporated by reference in their entireties.

TECHNICAL FIELD

This application relates to the field of power technologies, and in particular, to an electric appliance identification method and apparatus.

BACKGROUND

Power line communication (PLC) enables an analog signal or a digital signal to be modulated on a power line in a carrier manner for transmission, a network does not need to be reestablished, and data transfer can be performed as long as a power line is available. This is a unique communication mode of a power system. In a low-voltage power distribution network, an existing low-voltage power line is used as a transmission medium for communication, and this has advantages of simple networking, no need of rewiring, and low costs.

However, the low-voltage power line is originally designed to transmit power to an electric appliance in a circuit, not for communication. The electric appliance in the circuit generates electromagnetic interference (namely, a noise signal) in a use process, affecting communication quality of a PLC device. Therefore, identifying a noisy electric appliance in the circuit helps reduce maintenance costs of the PLC device that is interfered with.

A current electric appliance identification method is mainly based on smart meter data. To be specific, a working electric appliance is identified by monitoring electric appliance load data, in a user's home, that is recorded by a smart meter. For example, based on four features of the smart meter data: active power P, reactive power Q, a harmonic component h, and harmonic magnitude mh, all possible feature combinations are stored in advance, and to-be-identified feature combinations are compared item by item to identify the electric appliance. However, in the foregoing method, when a quantity of electric appliances in the user's home increases, a quantity of the feature combinations increases exponentially.

SUMMARY

Embodiments of this application provide an electric appliance identification method and apparatus, to easily and efficiently implement electric appliance identification.

According to a first aspect, an embodiment of this application provides an electric appliance identification method, including: A PLC device obtains a noise signal in a circuit; the PLC device obtains first data based on the noise signal, where the first data is used to describe a time-frequency feature of the noise signal; and the PLC device obtains, based on an electric appliance identification model and the first data, an electric appliance identification result corresponding to the noise signal, where the electric appliance identification model is obtained based on a signal including a noise signal of at least one known electric appliance.

Compared with a conventional-technology method for identifying an electric appliance based on smart meter data, the method in this embodiment of this application enables the PLC device to obtain the noise signal in the circuit, obtain the first data based on the noise signal, and further obtain, based on the electric appliance identification model and the first data, the electric appliance identification result corresponding to the noise signal. In this way, in this embodiment of this application, without using an additional device, for example, a smart meter, the PLC device is directly configured to collect the noise signal and extract the time-frequency feature of the noise signal as the first data, and can identify an electric appliance with severe interference to a line based on the electric appliance identification model, to reduce maintenance costs of the PLC device that is interfered with. The method is simple and convenient.

In a possible design, the PLC device sends the first data to a server, and the server stores the electric appliance identification model. The PLC device receives, from the server, the electric appliance identification result corresponding to the noise signal.

According to the foregoing design, the server may use received first data sent by each PLC device as a training sample, to continuously improve and modify the electric appliance identification model, so as to improve accuracy of the electric appliance identification result obtained based on the electric appliance identification model.

In a possible design, when the PLC device obtains the first data based on the noise signal, the PLC device may divide the noise signal into segments, and obtain the first data based on the segmented noise signal.

The foregoing design can avoid uploading an excessive amount of data to the server.

In a possible design, a signal length of the noise signal is at least one alternating current cycle, the noise signal includes N sampling points, and N is a positive integer. That the PLC device obtains the first data based on the segmented noise signal may include: dividing the N sampling points into M segments, and extracting a time-domain feature for each of the M segments to obtain one piece of M-dimensional data, where M is a positive integer, and $M \leq N$; dividing the N sampling points into K segments, selecting L segments from the K segments, and extracting a frequency-domain feature for each of the L segments to obtain L pieces of M-dimensional data, where both L and K are positive integers, and $L \leq K \leq N$; and using, by the PLC device, the piece of M-dimensional data and the L pieces of M-dimensional data as the first data.

According to the foregoing design, the time-frequency feature of the noise signal may be easily and efficiently extracted.

In a possible design, that the PLC device extracts the time-domain feature for each of the M segments may be: The PLC device calculates a maximum value, an average value, or a quantile for each of the M segments.

According to the foregoing design, the time-domain feature of the noise signal may be easily and efficiently extracted.

In a possible design, the L segments include at least one of a segment in which the sampling point includes a crest, a segment in which the sampling point includes a trough, and a segment in which the sampling point includes a zero point.

According to the foregoing design, because the signal length of the noise signal is at least one alternating current cycle, if the PLC device extracts a frequency-domain feature for at least one of the three segments, a main frequency-domain feature in the entire alternating current cycle may be extracted. In other words, more frequency-domain features are obtained by using fewer segments.

In a possible design, that the PLC device extracts the frequency-domain feature for each of the L segments may be: The PLC device calculates a power spectral density, an energy spectral density, or a frequency spectral density for each of the L segments.

According to the foregoing design, the frequency-domain feature of the noise signal may be easily and efficiently extracted.

In a possible design, after the PLC device obtains the electric appliance identification result corresponding to the noise signal, the PLC device sends the electric appliance identification result to a terminal device.

According to the foregoing design, to ensure normal working of the PLC device, a user may turn off, based on the electric appliance identification result, an electric appliance indicated by the electric appliance identification result or reduce power of an electric appliance indicated by the electric appliance identification result.

According to a second aspect, an embodiment of this application provides an electric appliance identification apparatus. The apparatus may be a PLC device, or a chip in a PLC device. The apparatus may include a processing unit, a sending unit, and a receiving unit. When the apparatus is a PLC device, the processing unit may be a processor, and the sending unit and the receiving unit may be a transceiver. The PLC device may further include a storage unit, and the storage unit may be a memory. The storage unit is configured to store instructions, and the processing unit executes the instructions stored in the storage unit, to enable the PLC device to perform the method according to any one of the first aspect or the possible designs of the first aspect. When the apparatus is a chip in a PLC device, the processing unit may be a processor, and the sending unit and the receiving unit may be an input/output interface, a pin, a circuit, or the like. The processing unit executes instructions stored in a storage unit, to enable the chip to perform the method according to any one of the first aspect or the possible designs of the first aspect. The storage unit is configured to store the instructions, and the storage unit may be a storage unit (for example, a register or cache) in the chip, or a storage unit (for example, a read-only memory or a random access memory) that is in the PLC device and that is located outside the chip.

According to a third aspect, an embodiment of this application further provides a computer-readable storage medium. The computer-readable storage medium stores a computer program, and when the computer program is run on a computer, the computer is enabled to perform the method according to the first aspect.

According to a fourth aspect, an embodiment of this application further provides a computer program product including a program. When the computer program product runs on a computer, the computer is enabled to perform the method according to the first aspect.

BRIEF DESCRIPTION OF DRAWINGS

FIG. 2 is a schematic diagram of interaction between a PLC device and a server according to this application;

FIG. 3 is an overview flowchart of an electric appliance identification method according to this application;

DESCRIPTION OF EMBODIMENTS

To make the objectives, technical solutions, and advantages of the embodiments of this application clearer, the following clearly describes the technical solutions in the embodiments of this application with reference to the accompanying drawings in the embodiments of this application.

Figure 1:
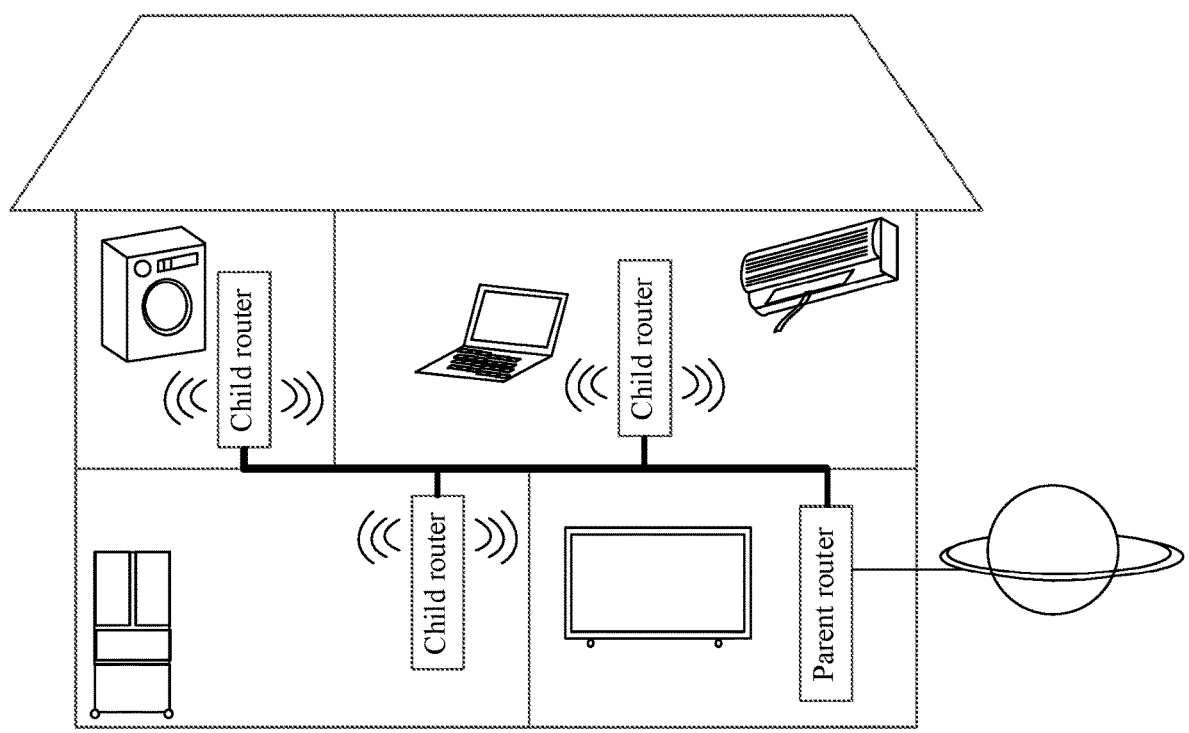
FIG. 1 is a schematic diagram of distribution of household electric appliances and PLC devices according to this application.

The embodiments of this application may be applied to an interference source locating scenario of a household PLC device. FIG. 1 is a schematic diagram of distribution of household electric appliances and PLC devices. The PLC devices shown in FIG. 1 include one parent router and three child routers. The parent router and the three child routers are in one meter loop, the three child routers are separately distributed in three rooms, and the parent router is connected to a network through a network cable. A network transmission function of the PLC device is powerful, but is easily interfered with by a noise signal generated by a surrounding electric appliance. The electric appliances such as a television, an air conditioner, a computer, a refrigerator, and a washing machine in FIG. 1 may interfere with the surrounding PLC devices. It should be understood that the schematic diagram shown in FIG. 1 is merely an example, and should not be understood as a limitation on the implementation scope of this application.

In this embodiment of this application, the PLC device is a device that converts, by using a power line as a communications bearer, any power socket in a meter loop into a network interface. The PLC device is plug-and-play, and can be connected to a network without additional cabling. For example, the PLC device may be a power line communication modem, dual-routers, or the like. FIG. 2 is a schematic diagram of interaction between a PLC device and a server according to this application. The server may be configured to store an electric appliance identification model, and may further be configured to train the electric appliance identification model. For example, the server may be a cloud analyzer, namely, a computing unit deployed on a cloud.

It should be understood that different brands and different types of electric appliances generate different noise signals in a circuit. Therefore, a purpose of identifying the electric appliance may be achieved by identifying the noise signal. However, the noise signals of the electric appliances have various types, and a line, a circuit breaker, a bridge, and the like have different impact on attenuation of the noise signals. Therefore, the noise signal is highly time varying, and it is difficult to perform feature extraction by using a common manual method. Based on this, an embodiment of this application provides an electric appliance identification method, to easily and efficiently identify an electric appliance, so as to reduce maintenance costs of a PLC device that is interfered with. Refer to FIG. 3. The method includes the following steps.

Step 300: The PLC device obtains a noise signal in a circuit.

Specifically, the PLC device processes a signal transmitted in the circuit, to extract the noise signal.

Figure 4A:
FIG. 4(a) is a schematic diagram of a noise signal whose signal length is one alternating current cycle according to this application.
Figure 4B:
FIG. 4(b) is a schematic diagram of extracting a time-domain feature for a noise signal according to this application.
Figure 4C:
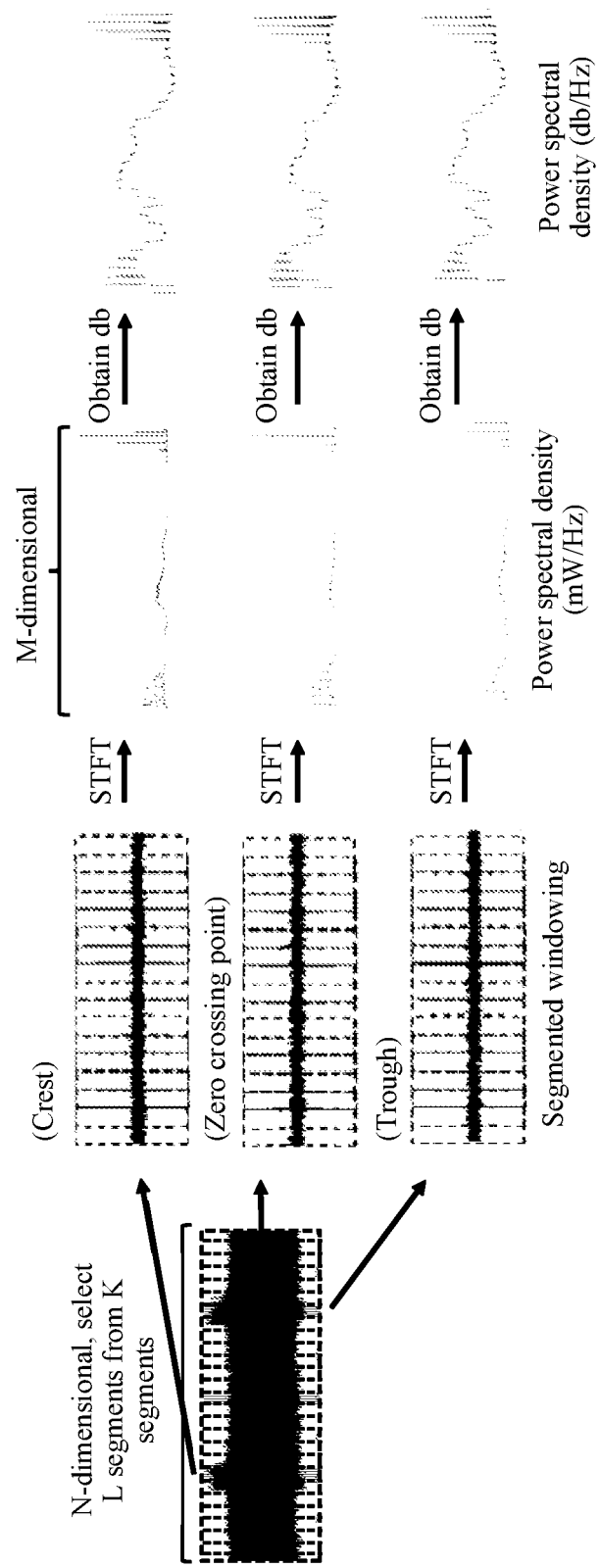
FIG. 4(c) is a schematic diagram of extracting a frequency-domain feature for a noise signal according to this application.

In a possible design, a signal length of the noise signal is at least one alternating current cycle, the noise signal includes N sampling points, and N is a positive integer. For example, for a low-voltage power distribution network whose power frequency is 50 Hz, a signal length of a noise signal collected by the PLC device may be one or more complete alternating current cycles. When the signal length of the noise signal is one alternating current cycle, the signal length of the noise signal is 20 ms, as shown in FIG. 4(*a*).

For example, the PLC device may periodically obtain the noise signal in the circuit. Alternatively, when detecting that network communication quality is poor, the PLC device obtains the noise signal in the circuit.

Step 310: The PLC device obtains first data based on the noise signal.

If the PLC device directly uploads the collected noise signal to a server, a data amount is large. Therefore, the PLC device may divide the noise signal into segments to obtain the first data, that is, compress the noise signal to a specific extent.

In a possible design, the PLC device may divide the N sampling points into M segments, and extract a time-domain feature for each of the M segments to obtain one piece of M-dimensional data, that is, M pieces of time-domain feature information, where M is a positive integer, and M≤N. The PLC device may further divide the N sampling points into K segments, select L segments from the K segments, and extract a frequency-domain feature for each of the L segments to obtain L pieces of M-dimensional data, where both L and K are positive integers, and L≤K≤N. Based on this, the PLC device obtains L+1 pieces of M-dimensional data as the first data. It should be understood that when L≠M, after extracting the frequency-domain feature for each of the L segments, the PLC device first obtains L results. To have a same dimension as the piece of M-dimensional data obtained by extracting the time-domain feature for each of the M segments, the L results may be transformed into the L pieces of M-dimensional data by using a mathematical transformation method well known to a person skilled in the art, so as to meet a subsequent calculation requirement. A specific mathematical transformation method is not described herein again.

Further, extracting the time-domain feature for each of the M segments may be calculating a maximum value, an average value, a quantile, or the like for each of the M segments. Extracting the frequency-domain feature for each of the L segments may be calculating a power spectral density, an energy spectral density, a frequency spectral density, or the like for each of the L segments. The L segments herein may include at least one of a segment in which the sampling point includes a crest, a segment in which the sampling point includes a trough, and a segment in which the sampling point includes a zero point. In an optional embodiment, when L=3, and the three segments are respectively the segment in which the sampling point includes the crest, the segment in which the sampling point includes the trough, and the segment in which the sampling point includes the zero point, because the signal length of the noise signal is at least one alternating current cycle, if the PLC device extracts frequency-domain features for the three segments, a main frequency-domain feature in the entire alternating current cycle may be extracted. In other words, more frequency-domain features are obtained by using fewer segments.

In an optional embodiment, the noise signal is finely divided into segments, to obtain the M segments, where M<N, and the time-domain feature is extracted for each segment to obtain the piece of M-dimensional data, as shown in FIG. 4(*b*). The noise signal is coarsely divided into segments, to obtain the K segments, where K<M<N, and the frequency-domain features are extracted for the L segments in the K segments. For example, when L=3, and the three segments are the segment in which the sampling point includes the crest, the segment in which the sampling point includes the trough, and the segment in which the sampling point includes the zero point, power spectral densities are separately calculated for the three segments to obtain the L pieces of M-dimensional data, as shown in FIG. 4(*c*). The obtained L+1 pieces of M-dimensional data are used as the first data.

It should be understood that there may be a plurality of implementations for dividing the noise signal into segments and extracting the time-frequency feature to obtain the first data herein. This is merely an example, and this application is not limited thereto.

Step 320: The PLC device obtains, based on an electric appliance identification model and the first data, an electric appliance identification result corresponding to the noise signal, where the electric appliance identification model is obtained based on a signal including a noise signal of at least one known electric appliance. It should be understood that the PLC device may store the electric appliance identification model, or another device may store the electric appliance identification model. In a possible design, the PLC device sends the first data to the server, and the server stores the electric appliance identification model. The server obtains, based on the electric appliance identification model and the first data, the electric appliance identification result corresponding to the noise signal, and sends, to the PLC device, the electric appliance identification result corresponding to the noise signal. An advantage of storing the electric appliance identification model by the server is that the server may use received first data sent by each PLC device as a training sample to continuously improve and modify the electric appliance identification model, so as to improve accuracy of the electric appliance identification result obtained based on the electric appliance identification model.

For example, a plurality of child PLC devices and a parent PLC device are installed in one indoor space, the parent PLC device and the plurality of child PLC devices are in one meter loop, and at least one child PLC device may be installed in each room. The child PLC device may obtain the noise signal in the circuit, and obtain the first data based on the noise signal. The child PLC device transmits the first data to the parent PLC device, and the parent PLC device uploads the received first data to the server. Alternatively, the child PLC device may obtain the noise signal in the circuit, and transmit the noise signal to the parent PLC device. The parent PLC device obtains the first data based on the noise signal, and uploads the first data to the server. Alternatively, the parent PLC device may obtain the noise signal in the circuit, obtain the first data based on the noise signal, and upload the first data to the server.

In addition, in a possible design, after the PLC device obtains the electric appliance identification result corresponding to the noise signal, the PLC device sends the electric appliance identification result to a terminal device. In another possible design, after the server obtains, based on the electric appliance identification model and the first data, the electric appliance identification result corresponding to the noise signal, the server sends, to the PLC device and the terminal device, the electric appliance identification result corresponding to the noise signal. The terminal device herein is a terminal device associated with the PLC device. In this way, after receiving the electric appliance identification result, to ensure normal working of the PLC device, the terminal device may turn off an electric appliance indicated by the electric appliance identification result or reduce power of an electric appliance indicated by the electric appliance identification result.

Figure 5:
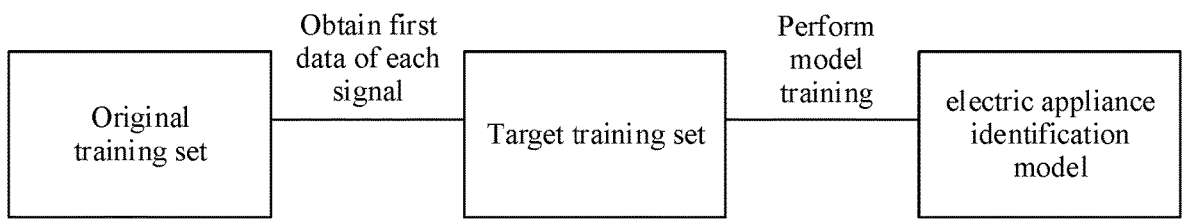
FIG. 5 is a schematic diagram of establishing an electric appliance identification model according to this application.

It should be understood that the following describes a process of establishing the electric appliance identification model by using only a processor as an example. The processor may be a processor in the server or a processor in another device. As shown in FIG. 5, the electric appliance identification model may be established by using, but not limited to, the following method.

Step 1: The processor uses, as an original training set, a large quantity of signals including a noise signal of at least one electric appliance. Specifically, each signal is truncated at a fixed length based on an alternating current cycle. For example, each signal has a signal length of at least one alternating current cycle, and includes N sampling points. For a low-voltage power distribution network whose power frequency is 50 Hz, a signal length of each signal is 20 ms. The signal including the noise signal of the at least one known electric appliance may be a separate noise signal of the known electric appliance or a mixed signal including the noise signal of the at least one known electric appliance, for example, a separate noise signal of an electric appliance A, a mixed signal including a noise signal of an electric appliance A, a mixed signal including a noise signal of an electric appliance A and a noise signal of an electric appliance B, or a mixed signal including a noise signal of an electric appliance A, a noise signal of an electric appliance B, and a noise signal of an electric appliance C. In an optional embodiment, the processor may further classify in advance each known electric appliance as a strong-interference electric appliance or a non-strong-interference electric appliance based on a type and a brand of the electric appliance. For example, a Dyson hair dryer and a Siemens washing machine are strong-interference electric appliances, and a Lenovo computer is a non-strong-interference electric appliance. When establishing the electric appliance identification model, the processor may use, as the original training set, a large quantity of signals including a noise signal of at least one strong-interference electric appliance, to reduce training complexity of the electric appliance identification model.

Step 2: The processor obtains for each signal in the original training set, first data of each signal, to form a target training set.

Specifically, the processor may divide, for each signal in the original training set, the N sampling points included in the signal into M segments, and extract a time-domain feature for each of the M segments to obtain one piece of M-dimensional data, where M is a positive integer, and M<N. The processor may further divide the N sampling points into K segments, select L segments from the K segments, and extract a frequency-domain feature for each of the L segments to obtain L pieces of M-dimensional data, where both L and K are positive integers, and L≤K≤N. Based on this, the processor may obtain L+1 pieces of M-dimensional data as the first data of the signal, so that the processor may obtain, for each signal in the original training set, the first data of each signal as the target training set.

In an optional embodiment, it is assumed that each signal in the original training set includes 4,000,000 sampling points. For any signal in the original training set, the signal is first finely and equally divided into 1,600 segments, and maximum smoothing (for example, obtaining a maximum value, an average value, or a quantile) is performed on each segment to obtain data whose dimension is 1,600, that is, 1,600 pieces of time-domain feature information. Then, the 4,000,000 sampling points are coarsely and equally re-divided into 40 segments, and three segments are selected: a segment in which the sampling point includes a crest, a segment in which the sampling point includes a trough, and a segment in which the sampling point includes a zero point. A power spectral density is separately calculated to obtain three pieces of frequency-domain feature information. Window adjusting is further performed, so that a dimension of obtained frequency-domain feature data is the same as a dimension of time-domain feature data, so as to obtain three pieces of data whose dimensions are 1,600. The processor obtains the first data of the signal. The first data of the signal includes four pieces of data whose dimensions are 1,600, and corresponds to the 1,600 pieces of time-domain feature information and the 4,800 pieces of frequency-domain feature information. Further, by using the foregoing method, the processor obtains the target training set, and each piece of first data in the target training set includes four pieces of data whose dimensions are 1,600.

Step 3: The processor performs model training based on the target training set to obtain the electric appliance identification model.

Figure 6:
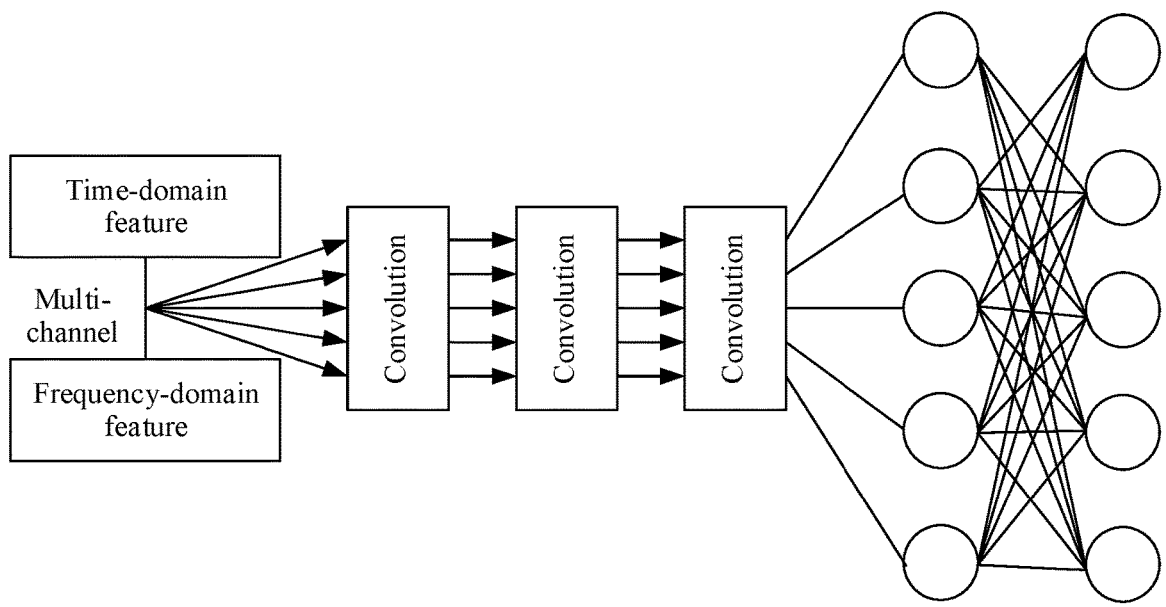
FIG. 6 is a schematic diagram of performing model training by using a neural network model according to this application.

For example, the processor further performs feature extraction and learning based on the target training set by using a supervised machine learning method, to train the electric appliance identification model. The supervised machine learning method may be a neural network mathematical model, and may be specifically a convolutional neural network (CNN) implementation model. In an optional embodiment, the processor may input, in a multi-channel form, each piece of the first data in the target training set to a neural network model including three convolutional layers and two fully connected layers for model training, as shown in FIG. 6.

A specific model training process may include but is not limited to the following steps:

Step 301: The processor performs one-hot encoding on an electric appliance label. For example, the electric appliance label is a Midea humidifier, and a corresponding training label is [1 0 0 0 0], or the electric appliance label is a OnePlus mobile phone, and a corresponding training label is [0 1 0 0 0], or the electric appliance label is a Flyco hair dryer, and a corresponding training label is [0 0 1 0 0], or the electric appliance label is a Siemens washing machine, and a corresponding training label is [0 0 0 1 0], or the electric appliance label is an Opple desk lamp, and a corresponding training label is [0 0 0 0 1], or the electric appliance label is a OnePlus mobile phone and a Siemens washing machine, and a corresponding training label is [0 1 0 1 0].

Step 302: The processor performs random initialization on a coefficient of each layer of the neural network model.

Step 303: The processor propagates the input first data through the convolutional layers and the fully connected layers to obtain an output value, and activates the output value by using a sigmoid function, that is, maps the output value to a range [0, 1], to obtain an output probability value, namely, an appearance probability value of each type of electric appliance.

Step 304: The processor obtains an error between the output probability value and the electric appliance label, where specifically, the error may be obtained by using a loss function (Margin Loss).

Step 305: If the error is greater than a specified threshold, the processor may update a network weight.

Step 306: The processor continuously iteratively updates the network weight by performing step 304 until the error is less than the specified threshold, and ends the training.

For example, an error is separately calculated for each classification by using the loss function. When an output probability value of a correct classification (a noise signal of an electric appliance is indeed included in a mixed signal) is less than 0.9, a square of a part less than 0.9 is used as the error of the classification. When an output probability value of an incorrect classification (a noise signal of an electric appliance is excluded in a mixed signal) is greater than 0.1, a square of a part greater than 0.1 is used as the error of the classification. Then, the errors of the two classifications are multiplied by different weights to obtain a total error between the output probability value and the electric appliance label, that is, a sum of the error of the correct classification and the error of the incorrect classification. For example, if first data input in an iteration is first data of a mixed signal including a noise signal of the Midea humidifier, and the mixed signal excludes a noise signal of the OnePlus mobile phone, a noise signal of the Flyco hair dryer, a noise signal of the Siemens washing machine, and a noise signal of the Opple desk lamp, a training label in this training is [1 0 0 0 0]. If an output probability value is [0.8 0.1 0 0.2 0], it indicates that an appearance probability of the Midea humidifier is 0.8, an appearance probability of the OnePlus mobile phone is 0.1, an appearance probability of the Flyco hair dryer is 0, an appearance probability of the Siemens washing machine is 0.2, and an appearance probability of the Opple desk lamp is 0. 0.8 is the output probability value of the correct classification, and other values are output probability values of incorrect classifications. In this case, the output probability value of the correct classification is less than 0.9, and the probability value of the incorrect classification is greater than 0.1. It is assumed that a weight value of the correct classification is 1, and a weight value of the incorrect classification is 0.5. Therefore, an error in this training is $(0.9-0.8)^2+0.5(0.2-0.1)^2=0.015$. $(0.9-0.8)^2$ is the error of the correct classification, and $(0.2-0.1)^2$ is the error of the incorrect classification. In this case, if the specified threshold is 0.01, the processor needs to continuously iteratively update the network weight until the error is less than the specified threshold.

The electric appliance identification model obtained by using the foregoing method not only has good immunity to interference from signal attenuation and time varying, but also can identify a plurality of strong-interference electric appliances in mixed noise by learning a plurality of electric appliance labels.

Further, after the training of the electric appliance identification model is completed, the model may be deployed on the server. The PLC device may obtain, for a collected noise signal, first data corresponding to the noise signal, and send the first data to the server. The server obtains an electric appliance identification result based on the electric appliance identification model and the first data, and feeds back the electric appliance identification result to the PLC device.

In a possible design, the electric appliance identification result corresponding to the noise signal indicates at least one electric appliance or indicates that no strong-interference electric appliance exists.

In an optional embodiment, the server uses the first data as input data, obtains an output probability value based on the electric appliance identification model, and feeds back the output probability value as the electric appliance identification result. Alternatively, the server feeds back, as the electric appliance identification result, an identifier of an electric appliance indicated by the output probability value. For example, it is assumed that the output probability value is [0.91 0.18 0.92 0.05 0]. The server may directly feed back, to the PLC device, the output probability value as the electric appliance identification result. Alternatively, the server obtains, through parsing based on the output probability value, that electric appliances indicated by the output probability value are the Midea humidifier and the Flyco hair dryer, and therefore feeds back, to the PLC device, an identifier of the Midea humidifier and an identifier of the Flyco hair dryer as the electric appliance identification result.

In another optional embodiment, the server uses the first data as input data, and obtains an output probability value based on the electric appliance identification model. If all output probability values are less than a preset threshold, the electric appliance identification result fed back by the server to the PLC device indicates that no strong-interference electric appliance exists. For example, it is assumed that the output probability value is [0.11 0.18 0.02 0.05 0], the preset threshold is 0.2. The electric appliance identification result fed back by the server to the PLC device indicates that no strong-interference electric appliance exists.

Compared with a conventional-technology method for identifying an electric appliance based on smart meter data, the method in this embodiment of this application enables the PLC device to obtain the noise signal in the circuit, obtain the first data based on the noise signal, and further obtain, based on the electric appliance identification model and the first data, the electric appliance identification result corresponding to the noise signal. In this way, in this embodiment of this application, without using an additional device, for example, a smart meter, the PLC device is directly configured to collect the noise signal and extract the time-frequency feature of the noise signal as the first data, and can identify an electric appliance with severe interference to a line based on the electric appliance identification model, to reduce maintenance costs of the PLC device that is interfered with. The method is simple and convenient.

In the foregoing embodiments provided in this application, the solutions of the electric appliance identification method provided in the embodiments of this application are separately described from perspectives of the PLC device and the interaction between the PLC device and the server. It may be understood that, to implement the foregoing functions, the PLC device and the server each include a corresponding hardware structure and/or software module for implementing each function. A person skilled in the art should easily be aware that units and algorithm steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each specific application, but it should not be considered that the implementation goes beyond the scope of this application.

Figure 7:
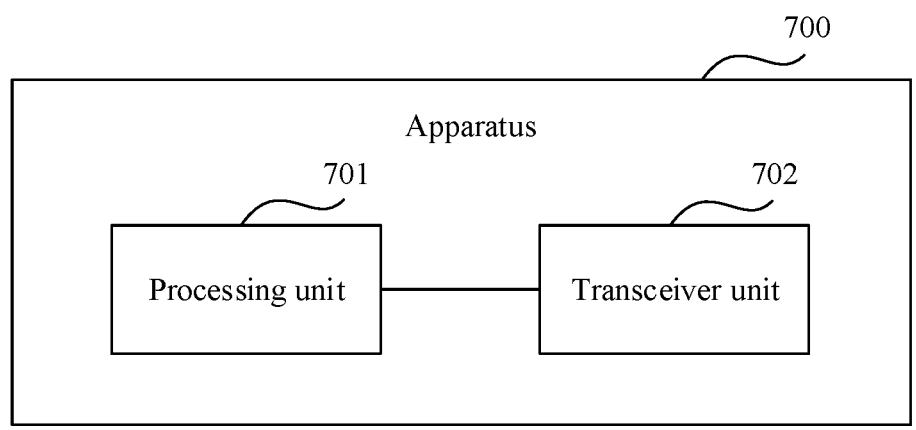
FIG. 7 is a schematic diagram 1 of a structure of an apparatus according to this application.

Same as the foregoing idea, as shown in FIG. 7, an embodiment of this application further provides an apparatus 700. The apparatus 700 includes a transceiver unit 702 and a processing unit 701. It should be understood that the apparatus shown in FIG. 7 may be the PLC device in the embodiments corresponding to FIG. 3 to FIG. 6.

In an example, the apparatus 700 is configured to implement functions of the PLC device in the foregoing method. The apparatus may be a PLC device, or an apparatus in a PLC device.

The processing unit 701 obtains a noise signal in a circuit.

The processing unit 701 obtains first data based on the noise signal, and the first data is used to describe a time-frequency feature of the noise signal.

The processing unit is further configured to obtain, based on an electric appliance identification model and the first data, an electric appliance identification result corresponding to the noise signal, where the electric appliance identification model is obtained based on a signal including a noise signal of at least one known electric appliance. The processing unit 701 may invoke the transceiver unit 702, to send the first data to a server, where the server stores the electric appliance identification model; and receive, from the server, the electric appliance identification result corresponding to the noise signal.

For specific execution processes of the processing unit 701 and the transceiver unit 702, refer to the descriptions in the foregoing method embodiments. Division into modules in this embodiment of this application is an example, is merely logical function division, and may be other division in an actual implementation. In addition, function modules in the embodiments of this application may be integrated into one processor, or each of the modules may exist alone physically, or two or more modules are integrated into one module. The integrated module may be implemented in a form of hardware, or may be implemented in a form of a software function module.

As another optional variation, the apparatus may be a chip system. In this embodiment of this application, the chip system may include a chip, or may include a chip and another discrete component. For example, the apparatus includes a processor and an interface, and the interface may be an input/output interface. The processor implements functions of the processing unit 701, and the interface implements functions of the transceiver unit 702. The apparatus may further include a memory. The memory is configured to store a program that can be run on the processor. When the processor executes the program, the method of the embodiment shown in FIG. 3 is performed.

Figure 8:
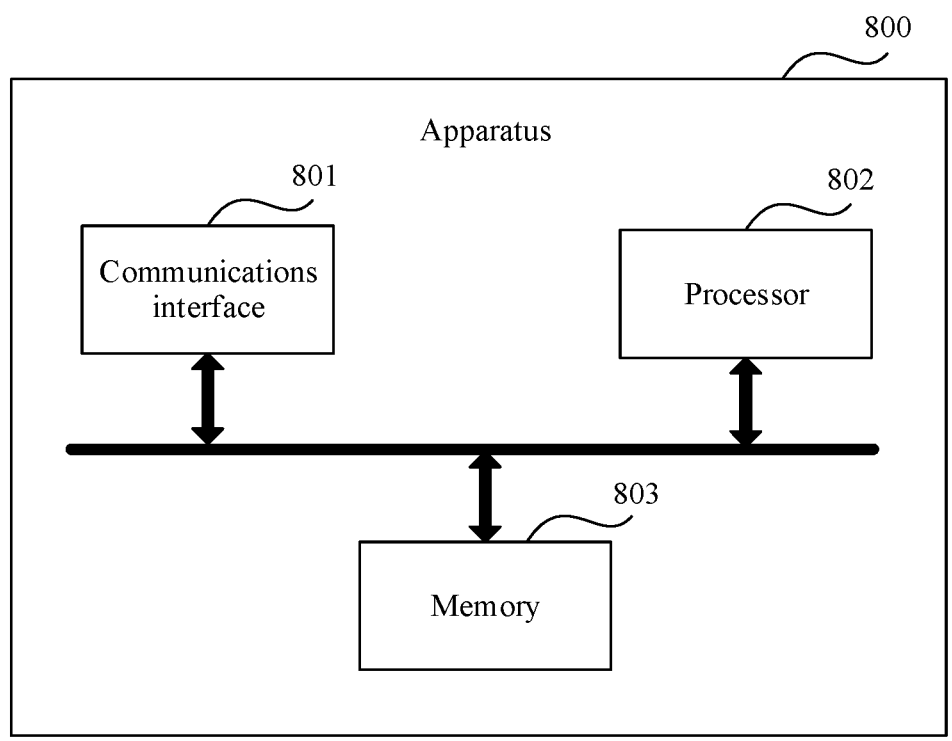
FIG. 8 is a schematic diagram 2 of a structure of an apparatus according to this application.

Same as the foregoing idea, as shown in FIG. 8, an embodiment of this application further provides an apparatus 800. It should be understood that the apparatus shown in FIG. 8 may be the PLC device in the embodiments corresponding to FIG. 3 to FIG. 6. The apparatus 800 includes a communications interface 801, at least one processor 802, and at least one memory 803. The communications interface 801 is configured to communicate with another device (for example, a server) through a transmission medium. The memory 803 is configured to store a computer program. The processor 802 invokes the computer program stored in the memory 803, to send and receive data through the communications interface 801, so as to implement the method in the foregoing embodiment shown in FIG. 3.

For example, when the apparatus is a PLC device, the memory 803 is configured to store the computer program. The processor 802 invokes the computer program stored in the memory 803, to perform, through the communications interface 801, the method performed by the PLC device in the foregoing embodiments.

In this embodiment of this application, the communications interface 801 may be a transceiver, a circuit, a bus, a module, or a communications interface of another type. The processor 802 may be a general-purpose processor, a digital signal processor, an application-specific integrated circuit, a field programmable gate array or another programmable logic device, a discrete gate or transistor logic device, or a discrete hardware component. The processor 802 may implement or perform the methods, steps, and logical block diagrams disclosed in the embodiments of this application. The general-purpose processor may be a microprocessor, any conventional processor, or the like. The steps of the methods disclosed with reference to the embodiments of this application may be directly performed by a hardware processor, or may be performed by a combination of hardware in the processor and a software module. The memory 803 may be a non-volatile memory, for example, a hard disk drive (HDD) or a solid-state drive (SSD), or may be a volatile memory, for example, a random access memory (RAM). The memory is any other medium that can be configured to carry or store expected program code in a form of an instruction or a data structure and that can be accessed by a computer, but is not limited thereto. The memory in this embodiment of this application may alternatively be a circuit or any other apparatus that can implement a storage function. The memory 803 is coupled to the processor 802. Coupling in this embodiment of this application may be indirect coupling or a communication connection between apparatuses, units, or modules in an electrical form, a mechanical form, or another form, and is used for information exchange between the apparatuses, the units, or the modules. In another implementation, the memory 803 may alternatively be located outside the apparatus 800. The processor 802 may operate in collaboration with the memory 803. The processor 802 may execute program instructions stored in the memory 803. At least one of the at least one memory 803 may alternatively be included in the processor 802. A connection medium between the communications interface 801, the processor 802, and the memory 803 is not limited in this embodiment of this application. For example, in this embodiment of this application, the memory 803, the processor 802, and the communications interface 801 may be connected through a bus in FIG. 8. The bus may be classified into an address bus, a data bus, a control bus, or the like.

It may be understood that the apparatus in the embodiment shown in FIG. 7 may be implemented by using the apparatus 800 shown in FIG. 8. Specifically, the processing unit 701 may be implemented by the processor 802, and the transceiver unit 702 may be implemented by the communications interface 801.

Figure 9:
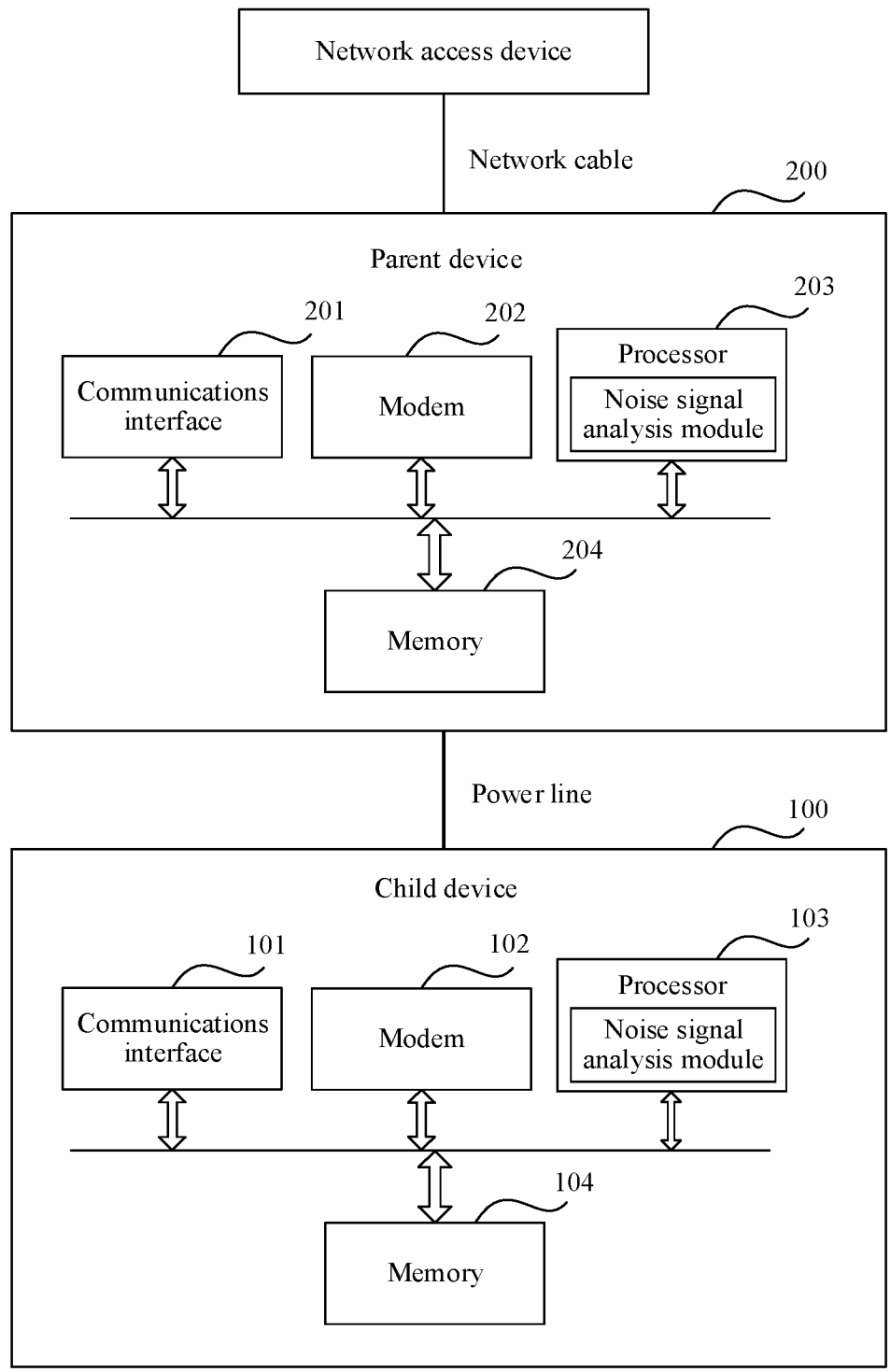
FIG. 9 is a schematic diagram of a structure of a PLC device according to this application.

For example, as shown in FIG. 9, an embodiment of this application further provides a PLC device, including a child device 100 and a parent device 200. It should be understood that the PLC device shown in FIG. 9 may be the PLC device in the embodiments corresponding to FIG. 3 to FIG. 6.

The child device 100 includes a communications interface 101, a modem 102, and a processor 103. Optionally, the child device 100 may further include a memory 104. The parent device 200 includes a communications interface 201, a modem 202, and a processor 203. Optionally, the parent device 200 may further include a memory 204. The parent device 200 is connected to a network access device through a network cable. The parent device 200 and the child device 100 are connected to each other through a power line, and belong to a same meter loop. The processor 103 and the processor 203 each may be a central processing unit (CPU), a hardware chip, or any combination thereof, and may implement or perform the methods, steps, and logical block diagrams disclosed in the embodiments corresponding to FIG. 3 to FIG. 6.

It may be understood that the apparatus in the embodiment shown in FIG. 7 may be implemented by using the PLC device shown in FIG. 9. Specifically, the processing unit 701 may be implemented by using the modem 102, the processor 103, the modem 202, and the processor 203. The transceiver unit 702 may be implemented by using the communications interface 101 and the communications interface 201.

The modem 102 in the child device 100 modulates uplink data, of user equipment, that is received through the communications interface 101, to obtain a modulated signal. The processor 103 loads the modulated signal to a current, to transmit the modulated signal to the parent device 200 through the power line. The processor 203 in the parent device extracts the modulated signal from a signal received from the child device 100, then demodulates the uplink data by using the modem 202, and sends the uplink data to the network access device through the network cable. Similarly, the modem 202 in the parent device 200 modulates downlink data, received through the communications interface 201, that is sent to the user equipment, to obtain a modulated signal. The processor 203 loads the modulated signal to a current, to transmit the modulated signal to the child device 100 through the power line. The processor 103 in the child device 100 extracts the modulated signal from a signal received from the parent device, then demodulates the downlink data by using the modem 102, and sends the downlink data to the user equipment through the communications interface 101.

In an example, as shown in FIG. 9, the processor 103 in the child device 100 includes a noise signal obtaining module, and the noise signal obtaining module is configured to obtain a noise signal in a circuit. The noise signal obtaining module may be specifically implemented in a form of hardware. For example, the noise signal obtaining module may include hardware such as a digital-to-analog converter, an analog-to-digital converter, and an analog front end. Alternatively, the noise signal obtaining module may be implemented in a form of a combination of hardware and a software function module. The processor 203 in the parent device 200 includes a noise signal analysis module, and the noise signal analysis module may obtain first data based on the noise signal collected by the child device 100. The noise signal analysis module may be specifically implemented in a form of hardware, or may be implemented in a form of a software function module, or may be implemented in a form of a combination of hardware and a software function module.

In an example, the processor 103 in the child device 100 includes a noise signal obtaining module and a noise signal analysis module. The noise signal obtaining module may obtain a noise signal in a circuit, and the noise signal analysis module may obtain first data based on the noise signal, and transmit the first data to the parent device 200.

In an example, the processor 203 in the parent device 200 includes a noise signal obtaining module and a noise signal analysis module. The noise signal obtaining module may obtain a noise signal in a circuit, and the noise signal analysis module may obtain first data based on the noise signal.

It should be understood that the noise signal obtaining module may be integrated inside the processor 103 (or the processor 203), or may be located outside the processor 103 (or the processor 203) as an independent chip. The noise signal analysis module may be integrated inside the processor 103 (or the processor 203), or may be located outside the processor 103 (or the processor 203) as an independent chip. The noise signal obtaining module and the noise signal analysis module may alternatively be integrated into a chip and outside the processor 103 (or the processor 203).

An embodiment of this application further provides a computer-readable storage medium. The computer-readable storage medium stores a computer program, and when the computer program is run on a computer, the computer is enabled to perform the method in the embodiment shown in FIG. 3.

All or some of the foregoing methods provided in the embodiments of this application may be implemented by using software, hardware, firmware, or any combination thereof. When software is used to implement the methods, all or some of the methods may be implemented in a form of a computer program product. The computer program product includes one or more computer instructions. When the computer program instructions are loaded and executed on the computer, the procedures or functions according to the embodiments of the present invention are all or partially generated. The computer may be a general-purpose computer, a dedicated computer, a computer network, a network device, user equipment, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

The foregoing embodiments are merely used to describe the technical solutions of this application. The descriptions of the foregoing embodiments are merely intended to help understand the method of the embodiments of the present invention, and shall not be construed as a limitation on the embodiments of the present invention. Variations or replacements readily figured out by a person skilled in the art shall fall within the protection scope of the embodiments of the present invention.

What is claimed is:

1. An electric appliance identification method, comprising:

obtaining, by a power line communication (PLC) device, a first noise signal in a circuit;

obtaining, by the PLC device, first data associated with a time-frequency feature of the first noise signal;

obtaining, by the PLC device based on an electric appliance identification model and the first data, an electric appliance identification result corresponding to the first noise signal, wherein the electric appliance identification model is obtained based on a signal comprising a second noise signal of at least one known electric appliance; and after obtaining the electric appliance identification result corresponding to the first noise signal, sending, by the PLC device, the electric appliance identification result to a terminal device.

2. The method according to claim 1, wherein obtaining the electric appliance identification result comprises:

sending, by the PLC device, the first data to a server, wherein the server stores the electric appliance identification model; and receiving, by the PLC device from the server, the electric appliance identification result corresponding to the first noise signal.

3. The method according to claim 1, wherein obtaining the first data comprises:

dividing, by the PLC device, the first noise signal into segments to obtain segmented noise signal, and obtaining the first data based on the segmented noise signal.

4. The method according to claim 3, wherein a signal length of the first noise signal is at least one alternating current cycle, the first noise signal comprises N sampling points, and N is a positive integer;

wherein dividing the first noise signal into segments comprises:

dividing, by the PLC device, the N sampling points into M segments, and extracting a time-domain feature for each of the M segments to obtain one piece of M-dimensional data, wherein M is a positive integer, and M≤N;

dividing, by the PLC device, the N sampling points into K segments, selecting L segments from the K segments, and extracting a frequency-domain feature for each of the L segments to obtain L pieces of M-dimensional data, wherein both L and K are positive integers, and L≤K≤N; and wherein obtaining the first data based on the segmented noise signal comprises:

using, by the PLC device, the piece of M-dimensional data and the L pieces of M-dimensional data as the first data.

5. The method according to claim 4, wherein the extracting, by the PLC device, a time-domain feature for each of the M segments comprises:

calculating, by the PLC device, a maximum value, an average value, or a quantile for each of the M segments.

6. The method according to claim 4, wherein the L segments comprise at least one of a segment in which a sampling point comprises a crest, a segment in which a sampling point comprises a trough, or a segment in which a sampling point comprises a zero point.

7. The method according to claim 4, wherein the extracting a frequency-domain feature for each of the L segments comprises:

calculating, by the PLC device, a power spectral density, an energy spectral density, or a frequency spectral density for each of the L segments.

8. An electric appliance identification apparatus, comprising:

at least one processor; and one or more memories coupled to the at least one processor and storing programming instructions for execution by the at least one processor to:

obtain a first noise signal in a circuit, wherein obtain first data associated with a time-frequency feature of the first noise signal;

obtain, based on an electric appliance identification model and the first data, an electric appliance identification result corresponding to the first noise signal, wherein the electric appliance identification model is obtained based on a second signal comprising a noise signal of at least one known electric appliance; and after obtaining the electric appliance identification result corresponding to the first noise signal, send the electric appliance identification result to a terminal device.

9. The apparatus according to claim 8, wherein the apparatus further comprises a transceiver, and wherein the programming instructions are for execution by the at least one processor to:

send, by the transceiver, the first data to a server, wherein the server stores the electric appliance identification model; and receive, by the transceiver from the server, the electric appliance identification result corresponding to the first noise signal.

10. The apparatus according to claim 8, wherein the programming instructions are for execution by the at least one processor to:

divide the first noise signal into segments to obtain segmented noise signal, and obtain the first data based on the segmented noise signal.

11. The apparatus according to claim 10, wherein a signal length of the first noise signal is at least one alternating current cycle, the first noise signal comprises N sampling points, and N is a positive integer; and wherein the programming instructions are for execution by the at least one processor to:

divide the N sampling points into M segments, and extract a time-domain feature for each of the M segments to obtain one piece of M-dimensional data, wherein M is a positive integer, and M≤N;

divide the N sampling points into K segments, select L segments from the K segments, and extract a frequency-domain feature for each of the L segments to obtain L pieces of M-dimensional data, wherein both L and K are positive integers, and L≤K≤N; and use the piece of M-dimensional data and the L pieces of M-dimensional data as the first data.

12. The apparatus according to claim 11, wherein the programming instructions are for execution by the at least one processor to calculate a maximum value, an average value, or a quantile for each of the M segments.

13. The apparatus according to claim 11, wherein the L segments comprise at least one of a segment in which a sampling point comprises a crest, a segment in which a sampling point comprises a trough, and a segment in which a sampling point comprises a zero point.

14. The apparatus according to claim 11, wherein the programming instructions are for execution by the at least one processor to calculate a power spectral density, an energy spectral density, or a frequency spectral density for each of the L segments.

15. A non-transitory computer storage medium, wherein the non-transitory computer storage medium stores computer-executable instructions, and when being invoked by a computer, the computer-executable instructions cause the computer to perform operations comprising:

obtaining a first noise signal in a circuit;

obtaining first data associated with a time-frequency feature of the first noise signal;

obtaining based on an electric appliance identification model and the first data, an electric appliance identification result corresponding to the first noise signal, wherein the electric appliance identification model is obtained based on a signal comprising a second noise signal of at least one known electric appliance; and after obtaining the electric appliance identification result corresponding to the first noise signal, sending the electric appliance identification result to a terminal device.

16. The non-transitory computer storage medium according to claim 15, wherein obtaining the electric appliance identification result comprises:

sending the first data to a server, wherein the server stores the electric appliance identification model; and receiving, from the server, the electric appliance identification result corresponding to the first noise signal.

17. The non-transitory computer storage medium according to claim 15, wherein obtaining the first data comprises:

dividing the first noise signal into segments to obtain segmented noise signal, and obtaining the first data based on the segmented noise signal.

18. The non-transitory computer storage medium according to claim 17, wherein a signal length of the first noise signal is at least one alternating current cycle, the first noise signal comprises N sampling points, and N is a positive integer;

wherein dividing the first noise signal into segments comprises:

dividing the N sampling points into M segments, and extracting a time-domain feature for each of the M segments to obtain one piece of M-dimensional data, wherein M is a positive integer, and M≤N;

dividing the N sampling points into K segments, selecting L segments from the K segments, and extracting a frequency-domain feature for each of the L segments to obtain L pieces of M-dimensional data, wherein both L and K are positive integers, and L≤K≤N; and wherein obtaining the first data based on the segmented noise signal comprises:

using the piece of M-dimensional data and the L pieces of M-dimensional data as the first data.

\* \* \* \* \*